United States Patent Office 3,541,184
Patented Nov. 17, 1970

3,541,184
IMPACT RESISTANT VINYL CHLORIDE POLYMER COMPOSITIONS
Robert D. Lundberg, Somerville, N.J., and Clyde J. Whitworth, Jr., Charleston, and William F. Garrett, Dunbar, W. Va., assignors to Union Carbide Corporation, a corporation of New York
No Drawing. Filed May 13, 1968, Ser. No. 728,792
Int. Cl. C08f 29/24
U.S. Cl. 260—876                               12 Claims

ABSTRACT OF THE DISCLOSURE

The impact strength of vinyl chloride polymers was improved without a significant lowering of heat distortion temperature by mixing them with about 3 to 20 percent by weight of terpolymers prepared by grafting bicyclo[2.2.1]hept-2-yl acrylate onto butadiene/styrene copolymer or butadiene/alkyl acrylate copolymer. The resultant compositions are particularly useful for fabricating molded or extruded shaped articles.

---

This invention relates to vinyl chloride polymer compositions having improved impact strength and particularly to such compositions containing graft terpolymers of bicyclo[2.2.1]hept-2-yl acrylate.

Vinyl chloride polymers have been known in the prior art. Compositions comprising such polymers together with modifiers have been used for the fabrication of diverse plastic articles. Although plasticizing modifiers make possible their use for manufacturing flexible sheeting and coverings, the poor impact strength of vinyl chloride polymers has limited their use in shaped article manufacture. The incorporation of known impact modifiers into vinyl chloride polymer compositions has been unsatisfactory because of the lowering of the heat distortion temperature of the base polymer, a case of the cure being worse than the malady.

Surprisingly, it has been found that compositions consisting essentially of an initmate mixture of:

(a) 97 to 80 parts by weight of normally solid vinyl chloride polymer and (b) 3 to 20 parts by weight of a graft terpolymer selected from the group consisting of terpolymers of bicyclo[2.2.1]hept-2-yl acrylate grafted onto a copolymer selected from the group consisting of butadiene/alkyl acrylate copolymer in which the alkyl group contains from 1 to about 18 carbon atoms or butadiene/styrene copolymer and bicyclo[2.2.1]hept-2-yl acrylate and styrene grafted onto a polymer selected from the group consisting of polybutadiene or butadiene/styrene copolymer.

The term "vinyl chloride polymer" as used in this application means homopolymers of vinyl chloride as well as copolymers of vinyl chloride with other copolymerizable vinyl monomers such as vinyl esters as for example, vinyl acetate, vinyl propionate, vinyl butyrate, vinyl stearate, allyl acetate, 2-chloroallyl acetate, isopropenyl acetate and the like; acrylic esters such as methyl acrylate, methyl methacrylate, ethyl acrylate, ethyl methacrylate, lauryl acrylate, lauryl methacrylate, stearyl acrylate, stearyl methacrylate and the like; alphaolefins containing 2 to about 18 carbon atoms, as for example, ethylene, propylene, butylene, isobutylene, neohexene, and the like; alkyl vinyl ethers as for example, methyl vinyl ether, ethyl vinyl ether, propyl vinyl ether, isopropyl vinyl ether, isobutyl vinyl ether, and the like; vinylidene halides as for example, vinylidene chloride, vinylidene bromide, vinylidene iodide, and vinylidene fluoride; esters of dibasic acids as for example, diethyl fumarate, dibutyl fumarate, diethylhexyl fumarate, dilauryl fumarate, diethyl maleate, dibutyl maleate, diethylhexyl maleate, dilauryl maleate, and the like; acrylonitrile, styrene, and the like.

The term "vinyl chloride polymer" also includes terpolymers derived from vinyl chloride copolymers as for example, vinyl chloride/vinyl acetate/vinyl alcohol terpolymers prepared by the partial hydrolysis of vinyl chloride/vinyl acetate copolymers.

The preferred vinyl chloride polymers include vinyl chloride homopolymers and vinyl chloride/ethylene copolymers containing a predominant amount of vinyl chloride copolymerized therein. It is particularly preferred to employ vinyl chloride homopolymers, that is, poly(vinyl chlorides) having an inherent viscosity of about 0.25 to about 1.5 when measured as a 0.2% solution in cyclohexanone at 25° C. and vinyl chloride/alpha olefin copolymers containing about 0.1 to 10 percent alpha olefin copolymerized therein having an inherent viscosity of about 0.25 to 1.5 at 25° C. when measured as a 0.2 percent solution in cyclohexanone. The preferred alpha olefin in these vinyl chloride/alpha olefin copolymers is ethylene.

When the vinyl chloride polymer of this invention is a poly(vinyl chloride) the preferred graft terpolymers are those prepared by grafting bicyclo[2.2.1]hept-2-yl acrylate onto butadiene/alkyl acrylate copolymers or onto butadiene/styrene copolymers. It is particularly preferred to use butyl acrylate as the comonomer of the butadiene/alkyl acrylate copolymers.

When the graft terpolymers contain butadiene/alkyl acrylate copolymer backbones, the butadiene content can range from about 1.0 to about 50 percent by weight, the alkyl acrylate content can range from about 30 to 80 weight percent and the bicyclo[2.2.1]hept-2-yl acrylate content can range from about 5 to 50 weight percent or based on the total weight of the total terpolymer. The preferred range of these components in the graft terpolymer is about 7 to 47 weight percent butadiene, 35 to 70 weight percent alkyl acrylate and about 6 to 33 weight percent of bicyclo[2.2.1]hept-2-yl acrylate. The particularly preferred range of these components in the graft terpolymer is about 21 to 47 weight percent butadiene, 35 to about 55 weight percent alkyl acrylate and about 6 to about 28 percent by weight of bicyclo[2.2.1]hept-2-yl acrylate.

Where the graft terpolymer contains a butadiene/styrene copolymer backbone, although the components can be present in a range of about 25 to 75 percent by weight of butadiene, 5 to 50 weight percent of styrene and about 5 to about 50 weight percent of bicyclo[2.2.1]hept-2-yl acrylate, it is preferred to use a terpolymer in which the components are present in a range of about 36 to 54 percent by weight butadiene, about 11 to 40 weight percent of styrene and about 21 to about 35 weight percent bicyclo[2.2.1]-hept-2-yl acrylate.

The terpolymers described above are comparably effective with the other preferred vinyl chloride polymers namely vinyl chloride/ethylene copolymers in imparting excellent impact strength without significant sacrifice of heat distortion temperature.

The compositions containing as little as about 3 and as much as about 20 weight percent of the above-described terpolymers can be used in the compositions of this invention. It is preferred, however, to use about 5 to about 15 percent terpolymer and particularly preferred to use about 6 to 10 percent by weight of terpolymer.

Other graft polymers that can be substituted for the preferred graft terpolymers described above include those prepared by grafting styrene and bicyclo[2.2.1]hept-2-yl acrylate onto a polybutadiene backbone, or by grafting styrene and bicyclo[2.2.1]-hept-2-yl acrylate onto a butadiene/styrene copolymer.

It is understood that the compositions of this invention can also contain other materials such as plasticizers, other impact modifiers, dyes, antioxidants, fillers, extenders and the like.

Both the vinyl chloride polymers and the graft polymers can be prepared by various polymerization systems well known in the art including bulk, solution, suspension, and emulsion techniques. It is preferred to prepare the graft polymer in an emulsion system using either t-butylperoxy pivalate or a water soluble redox catalyst system of ammonium persulfate and sulfur dioxide as the polymerization initiators. However, a wide range of either oil or water soluble free radical type catalyst can also be used. Chain terminators such as mercaptans as for example, tertiary dodecyl mercaptan and the like can be used as chain transfer agents to control the graft polymer molecular weight.

The impact resistant vinyl chloride polymer compositions of this invention can be formulated by mixing the vinyl chloride polymer with the graft terpolymer in conventional laboratory mixing equipment. It has been found convenient to flux the vinyl chloride polymer on a two roll laboratory mill with the graft terpolymer at a temperature of about 120 to 180° C. at the fast roll and 115 to 175° C. at the slow roll, followed by molding of the milled sheet into suitable specimens for physical testing.

TEST PROCEDURE

Samples for Izod Impact testing and heat distortion temperature determinations were compression molded from strips cut from the milled sheets into 0.5" x 0.125" x 5" bars for testing at specified temperatures.

The heat distortion temperature test was carried out according to ASTM method D–648–56 employing a fiber stress of 264 p.s.i. Izod impact strength was determined according to ASTM method D–256–56.

The graft polymers used in practice of this invention are novel polymers which were prepared in pre-dried Pyrex pressure bottles to which was charged the base polymer backbone in latex form together with the initiator, monomer or monomers and other ingredients followed by purging with nitrogen, capping and positioning in the rotating water bath. The water bath was thermostatically controlled at reaction temperatures 45 to 60° C. These base polymers were stable latices of poly(butadiene), poly(butadiene/bicycloheptyl acrylate) or poly-(butadiene/styrene). The graft terpolymers obtained in latex form were processed by adding a conventional rubber antioxidant such as 4,4-thiobis-6-tertiary butylmetacresol in methanol solution to initiate polymer coagulation. Complete coagulation was supplied by adding 1 percent calcium chloride in water based on the resin weight. The resin was washed for 15 minutes in distilled water at 80° C. followed by two additional water washers at room temperature. Two final washes were made with methanol at room temperature. The final alcohol wash contained 0.5 percent t-butyl p-cresol as a further aid to reduce polymer oxidation. The graft polymers were dried in an air forced oven at 55° C. for about 16 hours.

The invention is further described in greater detail in the examples which follow. All parts and percentages are by weight unless otherwise specified.

EXAMPLE 1

A Pyrex pressure bottle was charged with the following:

68.57 grams of a latex containing 24 grams of butadiene/butylacrylate copolymer (containing 15 percent by weight of butadiene and 85 percent by weight of butyl acrylate copolymerized therein)
6.00 grams bicyclo[2.2.1]hept-2-yl acrylate
24.49 grams distilled water
0.012 gram ammonium persulfate
1.00 gram sulfur dioxide/water (6 percent solution)

The bottle was purged with nitrogen, capped and agitated by means of a rotating water bath at 60° C. for 24 hours. The recovered polymer amounted to 27.0 grams (50.0 percent conversion of monomer) and contained 13.34 percent butadiene, 75.55 percent butyl acrylate and 11.11 percent bicycloheptyl acrylate polymerized therein.

EXAMPLE 2

A Pyrex pressure bottle was charged with the following:

80.00 grams of a latex (containing 24 grams of a butadiene styrene copolymer containing 75 percent butadiene and 25 percent styrene copolymerized therein)
6.00 grams bicycloheptyl acrylate
14.00 grams distilled water
0.28 cc. of a 75 percent solution of t-butyl peroxy pivalate in mineral spirits.

The bottle was purged with nitrogen, capped and agitated by means of a rotating bath at 45° C. for 24 hours. The recovered polymer amounted to 26 grams, 33.3 percent conversion of monomer and contained 69.22 percent butadiene, 23.08 percent styrene and 7.70 percent bicycloheptyl acrylate.

EXAMPLE 3

A pressure bottle was charged with the following:

109.0 grams of a polybutadiene latex containing 27 grams of resin
16.0 grams bicycloheptyl acrylate
6.89 grams distilled water
0.327 gram Siponate DS 10 (98 percent dodecyl benzene sodium sulfonate)
1.60 grams Tergitol NPX (10 percent nonyl phenyl polyalkylene glycol ether)
0.744 cc. of a 75 percent solution of t-butyl peroxy pivalate in mineral spirits The bottle was purged with nitrogen, capped and agitated by means of a rotating water bath at 60° C. for 88.25 hours. The recovered polymer amounted to 41 grams (87.5 percent conversion of monomer) and contains 65.85 percent butadiene and 34.15 percent bicycloheptyl acrylate.

EXAMPLE 4

Using the procedure described in Example 3 with a latex containing 24.8 grams of polybutadiene and 22 grams of styrene and 22 grams of bicycloheptyl acrylate a graft terpolymer was obtained containing 36 percent butadiene, 32 percent styrene and 32 percent bicycloheptyl acrylate.

EXAMPLE 5

Using the procedure in Example 3 with a latex containing 19.836 grams of poly(butadiene/styrene), 10.0 grams of styrene and 15.0 grams of bicycloheptyl acrylate a terpolymer was obtained containing 33.18 percent butadiene, 33.36 percent styrene and 33.46 percent bicycloheptyl acrylate.

EXAMPLE 6

Base copolymers used for the backbone of the graft terpolymers were prepared as follows:

A pressure bottle was charged with:

10.50 grams butadiene
119.0 grams distilled water
0.084 gram Tergitol NPX
3.43 grams Siponate DS–10 (98%)
11.70 grams sulfur dioxide/water (6 percent)
0.70 gram ammonium persulfate
59.50 grams butyl acrylate The bottles were purged with butadiene, capped and agitated by means of a rotating water bath at 50° C. for 93 hours. The monomer to polymer conversion was complete affording an emulsion containing 35 percent of a butadiene/butyl acrylate copolymer.

EXAMPLE 7

The copolymer of butadiene and styrene used as the backbone copolymer for the preparation of graft terpolymers was prepared as follows:

A pressure bottle was charged with:

45.0 grams of butadiene
15.0 grams styrene
140.0 grams distilled water
3.23 grams sodium lauryl sulfate (98 percent)
0.336 gram boric acid
0.192 gram sodium hydroxide
0.528 cc. t-dodecyl mercaptan
2.40 grams of a 75 percent solution of t-butyl peroxy pivalate in mineral spirits The bottles were purged with butadiene, capped and agitated by means of rotating water bath at 45° C. for 108.5 hours. The monomer to polymer conversion was essentially complete affording an emulsion containing a butadiene/styrene copolymer with a solid resin content of 30 percent. Other backbone polymers were prepared in a similar manner.

EXAMPLE 8

Poly(vinyl chloride) (92.0 parts) having an inherent viscosity of 0.78 (0.2 percent solution in cyclohexanone at 25° C.) was fluxed on a two roll laboratory mill heated to 165° C. at the fast roll (33.0 r.p.m.) and 135° C. at the slow roll (23.5 r.p.m.) with 8.0 parts of a bicyclo[2.2.1]hept-2-yl acrylate/(butadiene/butyl acrylate copolymer) graft terpolymer, 1.5 parts of Advastab T-270 (an organo tin mercaptide supplied by Advance Chemical Co.) vinyl resin stabilizer and 0.5 part of polyethylene. A milled sheet of the fluxed mixture was removed after five minutes from the laboratory mill and molded into test specimens at 180° C. The heat distortion temperature (264 p.s.i.) of this mixture was found to be 69° C. and the Izod impact strength 4.55 foot lb.

The effect of varying the ratios of the components of the graft terpolymer was observed with Examples 9–18 as shown in Table I.

Control A

A control mixture was prepared using the procedure described in Example 8 with the exception that the graft terpolymer and polyethylene were omitted. The control was compared in Table I with Examples 8–18.

EXAMPLES 19 TO 28

Poly(vinyl chloride) (92 parts) having an inherent viscosity of 0.78 blended with 8 parts of a bicyclo[2.2.1]-hept-2-yl acrylate/(butadiene/styrene copolymer) graft terpolymer (7.7 percent/69.2 percent/23.1 percent/) on a laboratory two roll mill as described in Example 8. Test specimens made from the resultant molded sheet showed a heat distortion temperature (264 p.s.i.) of 70° C. and an Izod impact strength of 1.57 ft. lb.

Examples 20–28 utilizing graft terpolymers in which the components are quantitatively varied were also measured as shown in Table II.

Control B

Example 19 was repeated with the exception that the graft terpolymer and the polyethylene were omitted. Control B was compared with Examples 19–28 in Table II.

EXAMPLES 29 to 37

A vinyl chloride/ethylene copolymer (92 parts) containing 1.05 weight percent of ethylene copolymerized therein and having an inherent viscosity of 0.77 (0.2 percent solution of cyclohexanone at 25° C.) was fluxed on a two roll mill heated to 160° C. at the fast roll (33.0 r.p.m.) and 150° C. at the slow roll (23.5 r.p.m.) with 8 parts of the graft terpolymer described in Example 8 for five minutes. A milled sheet was removed which was molded at 175° C. into test specimens. The heat distortion temperature (264 p.s.i.) of this mixture was 64° C. and the Izod impact strength was 1.07 ft. lb.

Examples 30–37 demonstrate in Table III the effect of varying the ratio of terpolymer components.

Control C

Example 29 was repeated with the exception that no graft terpolymer was used. The Control C was compared with Examples 29–37 in Table III.

EXAMPLES 38 to 47

A vinyl chloride/ethylene copolymer (92.0 parts) containing 1.05 percent ethylene copolymerized therein and having an inherent viscosity of 0.77 (0.2 percent solution in cyclohexanone at 25° C.) was blended with 8 parts of a bicyclo[2.2.1]hept-2-yl acrylate/(butadiene/styrene copolymer) graft terpolymer (7.7/percent/69.2 percent/23.1 percent/) on a two roll mill as described in Example 8. The fluxed sheet was molded into test specimens at 175° C. The heat distortion temperature was found to be 65° C. (264 p.s.i. and the Izod impact strength 0.91 ft. lb.)

Examples 39–47 demonstrate in Table IV the effect of varying the ratio of terpolymer components.

Control D

Example 38 was repeated with the exception that no graft terpolymer or polyethylene was employed. Test specimens obtained in the same manner showed a heat distortion temperature (264 p.s.i.) of 68° C. and an Izod impact strength of 0.56 ft. lb. These data are compared in Table IV with Examples 38–47.

While the invention has been described in its preferred forms, it is understood that the present disclosure has been made only by way of example, that numerous changes in the details may be resorted to without departing from the spirit and the scope of the invention.

TABLE I.—PHYSICAL PROPERTIES OF BLENDS OF POLY(VINYL CHLORIDE) AND BICYCLO[2.2.1]HEPT-2-YL ACRYLATE/(BUTYL ACRYLATE/BUTADIENE COPOLYMER) GRAFT TERPOLYMER

| Example | Graft polymer content | | | | PVC [4] parts | Heat dist., Temp. °C. | Izod impact, ft. lbs. |
| --- | --- | --- | --- | --- | --- | --- | --- |
| | Bu,[1] wt. percent | BA,[2] wt. percent | BCHA,[3] wt. percent | Parts | | | |
| 8 | 13.3 | 75.5 | 11.2 | 8.0 | 92.0 | 69 | 4.55 |
| Control A | 0 | 0 | 0 | 0 | 92.0 | 75 | 0.73 |
| 9 | 11.8 | 67.2 | 21.0 | 8.0 | 92.0 | 70 | 4.27 |
| 10 | 10.2 | 57.7 | 32.3 | 8.0 | 92.0 | 70 | 3.75 |
| 11 | 12.0 | 68.2 | 19.8 | 8.0 | 92.0 | 70 | 3.47 |
| 12 | 10.1 | 57.1 | 32.8 | 8.0 | 92.0 | 70 | 3.54 |
| 13 | 46.9 | 46.9 | 6.2 | 8.0 | 92.0 | 71 | 3.63 |
| 14 | 35.7 | 35.7 | 28.6 | 8.0 | 92.0 | 70 | 4.12 |
| 15 | 23.37 | 54.55 | 22.08 | 8.0 | 92.0 | 70 | 1.08 |
| 16 | 21.82 | 50.91 | 27.28 | 8.0 | 92.0 | 70 | 2.21 |
| 17 | 12.5 | 75.0 | 12.5 | 8.0 | 92.0 | 70 | 1.95 |
| 18 | 7.1 | 63.6 | 29.3 | 8.0 | 92.0 | 69 | 2.00 |

[1] Butadiene.
[2] Butyl acrylate.
[3] Bicyclo[2.2.1]hept-2-yl acrylate.
[4] Poly(vinyl chloride having an inherent viscosity 0.78 and Izod impact of 0.73 ft. lbs.

TABLE II.—PHYSICAL PROPERTIES OF BLENDS OF POLY(VINYL CHLORIDE)+BICYCLO [2.2.1]HEPT-2-YL ACRYLATE/(BUTADIENE/STYRENE COPOLYMER) GRAFT TERPOLYMER

| Example | Graft polymer content | | | | PVC,[4] parts | Heat dist., Temp. °C. | Izod impact, ft. lbs. |
| | Bu,[1] wt. percent | Sty.,[2] wt. percent | BCHA,[3] wt. percent | Parts | | | |
| --- | --- | --- | --- | --- | --- | --- | --- |
| 19 | 69.2 | 23.1 | 7.7 | 8.0 | 92.0 | 70 | 1.57 |
| Control B | | | | 0.0 | 92.0 | 75 | 0.73 |
| 20 | 65.6 | 21.9 | 12.5 | 8.0 | 92.0 | 70 | 3.02 |
| 21 | 61.4 | 20.4 | 18.2 | 8.0 | 92.0 | 70 | 2.55 |
| 22 | 58.0 | 19.3 | 22.7 | 8.0 | 92.0 | 69 | 1.94 |
| 23 | 39.5 | 39.5 | 21.0 | 8.0 | 92.0 | 70 | 1.53 |
| 24 | 36.7 | 36.7 | 26.6 | 8.0 | 92.0 | 70 | 2.45 |
| 25 | 47.4 | 17.6 | 35.0 | 8.0 | 92.0 | 70 | 0.96 |
| 26 | 48.75 | 16.25 | 35.0 | 8.0 | 92.0 | 69 | 0.66 |
| 27 | 53.3 | 11.7 | 35.0 | 8.0 | 92.0 | 70 | 0.66 |
| 28 | 34.33 | 34.33 | 31.34 | 8.0 | 92.0 | 70 | 0.81 |

[1] Butadiene.
[2] Styrene.
[3] Bicyclo[2.2.1]hept-2-yl acrylate.
[4] Poly(vinyl chloride) having an inherent viscosity of 0.78 and Izod impact of 0.73 ft. lb.

TABLE III.—PHYSICAL PROPERTIES OF VINYL CHLORIDE/ETHYLENE COPOLYMER +BICYCLO[2.2.1]HEPT-2-YL ACRYLATE/(BUTADIENE/BUTYL ACRYLATE COPOLYMER) GRAFT TERPOLYMER

| Example | Graft polymer content | | | | VC/Et,[4] parts | Heat dist., Temp. °C. | Izod impact ft. lbs. |
| | Bu,[1] wt. percent | BA,[2] wt. percent | BCHA,[3] wt. percent | Parts | | | |
| --- | --- | --- | --- | --- | --- | --- | --- |
| 29 | 13.3 | 75.5 | 11.2 | 8.0 | 92.0 | 64 | 1.07 |
| Control C | | | | 0.0 | 92.0 | 62 | 0.56 |
| 30 | 11.85 | 67.15 | 21.0 | 8.0 | 92.0 | 64 | 0.86 |
| 31 | 10.15 | 57.55 | 32.3 | 8.0 | 92.0 | 65 | 0.74 |
| 32 | 12.0 | 68.2 | 19.8 | 8.0 | 92.0 | 65 | 0.62 |
| 33 | 10.1 | 57.1 | 32.8 | 8.0 | 92.0 | 64 | 0.59 |
| 34 | 46.88 | 46.88 | 6.25 | 8.0 | 92.0 | 64 | 3.25 |
| 35 | 35.7 | 35.7 | 28.6 | 8.0 | 92.0 | 65 | 4.16 |
| 36 | 23.37 | 54.55 | 22.08 | 8.0 | 92.0 | 64 | 3.15 |
| 37 | 21.82 | 50.91 | 27.28 | 8.0 | 92.0 | 65 | 2.67 |

[1] Butadiene.
[2] Butyl acrylate.
[3] Bicyclo[2.2.1]hept-2-yl acrylate.
[4] Vinyl chloride/ethylene copolymer containing 1.05 wt. percent ethylene having an inherent viscosity of 0.77 and Izod impact of 0.56 ft. lbs.

TABLE IV.—PHYSICAL PROPERTIES OF VINYL CHLORIDE/ETHYLENE COPOLYMER +BICYCLO[2.2.1]HEPT-2-YL ACRYLATE/(BUTADIENE/STYRENE COPOLYMER) GRAFT TERPOLYMER

| Example | Graft polymer content | | | | VC/Et,[4] Parts | Dist., percent | Izod impact, ft. lbs. |
| | Bu,[1] wt. percent | Sty,[2] wt. percent | BCHA,[3] wt. percent | Parts | | | |
| --- | --- | --- | --- | --- | --- | --- | --- |
| 38 | 69.2 | 23.1 | 7.7 | 8.0 | 92.0 | 65 | 0.91 |
| Control D | | | | 0.0 | 92.0 | 68 | 0.56 |
| 39 | 65.6 | 21.9 | 12.5 | 8.0 | 92.0 | 64 | 0.87 |
| 40 | 61.4 | 20.4 | 18.2 | 8.0 | 92.0 | 64 | 0.59 |
| 41 | 66.6 | 22.2 | 11.2 | 8.0 | 92.0 | 64 | 0.72 |
| 42 | 58.0 | 19.3 | 22.7 | 8.0 | 92.0 | 65 | 0.61 |
| 43 | 39.5 | 39.5 | 21.0 | 8.0 | 92.0 | 64 | 1.88 |
| 44 | 36.7 | 36.7 | 26.6 | 8.0 | 92.0 | 65 | 2.30 |
| 45 | 47.4 | 17.6 | 35.0 | 8.0 | 92.0 | 65 | 2.28 |
| 46 | 18.75 | 16.25 | 35.0 | 8.0 | 92.0 | 64 | 1.91 |
| 47 | 53.3 | 11.7 | 35.0 | 8.0 | 92.0 | 65 | 1.33 |

[1] Butadiene.
[2] Styrene.
[3] Bicyclo[2.2.1]hept-2-yl acrylate.
[4] Vinyl chloride/ethylene copolymer containing 1.05 wt. percent ethylene having an inherent viscosity of 0.77 and izod impact of 0.56 ft. lbs.

What is claimed is:

1. Impact resistant vinyl chloride polymer composition consisting essentially of an intimate mixture of:
   (a) 97 to 80 parts by weight of normally solid vinyl chloride polymer and
   (b) 3 to 20 parts by weight of a graft terpolymer selected from the group consisting of terpolymers of bicyclo[2.2.1]hept-2-yl acrylate grafted onto a copolymer selected from the group consisting of butadiene/alkyl acrylate copolymer in which the alkyl group contains from 1 to about 18 carbon atoms and butadiene/styrene copolymer, and bicyclo[2.2.1]hept-2-yl acrylate and styrene grafted onto a polymer selected from the group consisting of polybutadiene and butadiene/styrene copolymer.

2. Composition claimed in claim 1 wherein the vinyl chloride polymer is polyvinyl chloride.

3. Composition claimed in claim 2 wherein the graft terpolymer consists of about 5 to 50% by weight of bicyclo[2.2.1]hept-2-yl acrylate grafted onto a butadiene/alkyl acrylate copolymer containing about 1 to 50 percent by weight of butadiene and about 30 to 80 percent by weight of alkyl acrylate copolymerized therein.

4. Composition claimed in claim 3 wherein the alkyl acrylate is butyl acrylate.

5. Compositions claimed in claim 2 wherein the graft terpolymer consists of about 5 to 50 percent by weight of bicyclo[2.2.1]hept-2-yl acrylate grafted onto a butadiene/styrene copolymer containing about 25 to 75 percent by weight of butadiene and about 5 to 50 percent by weight of styrene copolymerized therein.

6. Composition claimed in claim 2 containing about 5 to 15 parts of graft terpolymer.

7. Composition claimed in claim 1 wherein the vinyl chloride polymer is a copolymer of vinyl chloride and about 0.1 to 10 percent by weight of an $\alpha$-olefin having from 2 to about 10 carbon atoms.

8. Composition claimed in claim 1 wherein the $\alpha$-olefin is ethylene.

9. Composition claimed in claim 8 wherein the graft terpolymer consists of about 5 to 50 percent of bicyclo[2.2.1]hept-2-yl acrylate grafted onto a butadiene/alkyl acrylate copolymer containing about 30 to 80 percent by weight of butyl acrylate and about 1 to 50 percent by weight of butadiene copolymerized therein.

10. Composition claimed in claim 9 wherein the alkyl acrylate is butyl acrylate.

11. Composition claimed in claim 8 wherein the graft terpolymer consists of about 5 to 50 percent by weight of bicyclo[2.2.1]hept-2-yl acrylate grafted onto a butadiene/styrene copolymer containing about 25 to 75 percent by weight of butadiene and about 5 to 50 percent by weight of styrene copolymerized therein.

12. Composition claimed in claim 9 containing about 5 to 15 percent by weight of graft terpolymer.

References Cited

UNITED STATES PATENTS

| | | | |
|---|---|---|---|
| 2,939,852 | 6/1960 | Schmidle | 260—879 X |
| 2,943,074 | 6/1960 | Feuer | 260—876 X |
| 3,264,373 | 8/1966 | Whitworth et al. | 260—876 |
| 3,485,775 | 12/1969 | Cenci et al. | 260—899 |

MURRAY TILLMAN, Primary Examiner

H. ROBERTS, Assistant Examiner

U.S. Cl. X.R.

260—879, 899